(12) United States Patent
Oiwa et al.

(10) Patent No.: US 8,390,896 B2
(45) Date of Patent: Mar. 5, 2013

(54) IMAGE READING METHOD, IMAGE READING APPARATUS, AND PROGRAM RECORDING MEDIUM

(75) Inventors: Yasuyuki Oiwa, Tokyo (JP); Kiyoto Matsui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 12/606,132

(22) Filed: Oct. 26, 2009

(65) Prior Publication Data

US 2010/0103474 A1    Apr. 29, 2010

(30) Foreign Application Priority Data

Oct. 28, 2008    (JP) .................................. 2008-276876

(51) Int. Cl.
*H04N 1/407* (2006.01)
(52) U.S. Cl. ...................................... 358/3.26
(58) Field of Classification Search ................. 358/3.26, 358/1.13, 450; 399/81, 82, 83; 345/173; 715/700
See application file for complete search history.

(56) References Cited

U.S. PATENT DOCUMENTS

| 5,950,045 | A * | 9/1999 | Nomura et al. ................. 399/81 |
| 6,330,050 | B1 | 12/2001 | Takahashi |
| 8,159,690 | B2 * | 4/2012 | Motoyama .................... 358/1.13 |
| 2003/0043399 | A1 | 3/2003 | Johnston |
| 2005/0146760 | A1 | 7/2005 | Kim |
| 2007/0146819 | A1 | 6/2007 | Kai |
| 2007/0195378 | A1 | 8/2007 | Yoshida |
| 2008/0024845 | A1 | 1/2008 | Makino |
| 2008/0094669 | A1 | 4/2008 | Imai |

FOREIGN PATENT DOCUMENTS

| EP | 2093994 A1 | 8/2009 |
| JP | 8-195842 A | 7/1996 |
| JP | 10-307460 A | 11/1998 |
| JP | 2001-045239 A | 2/2001 |
| JP | 2005-109807 A | 4/2005 |
| JP | 2007-049603 A | 2/2007 |
| JP | 2008-042839 A | 2/2008 |
| JP | 2008-054289 A | 3/2008 |
| JP | 2008-060677 A | 3/2008 |
| JP | 2008-167352 A | 7/2008 |

* cited by examiner

*Primary Examiner* — Charlotte M Baker
(74) *Attorney, Agent, or Firm* — Canon USA, Inc., IP Division

(57) ABSTRACT

A method for image processing in which an image of a bound document such as a book placed face-down on a document positioning plate is read and processed is provided. The method includes reading the bound document through the document positioning plate, displaying the read image, the read image having at least one of a shadow portion of a bound portion and a shadow portion of an edge portion, inputting information about a direction attribute of a rectangular area of the shadow portion in the displayed image, determining the direction attribute based on the input information, and correcting a density of the rectangular area based on the determined direction attribute.

12 Claims, 12 Drawing Sheets

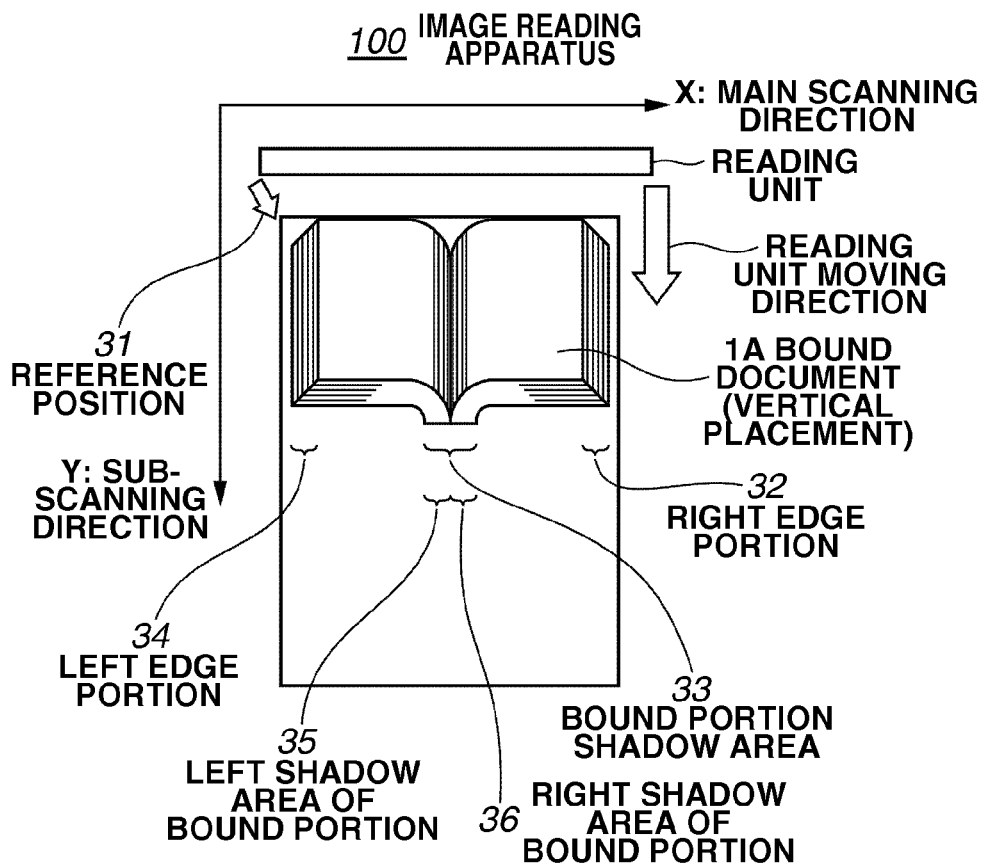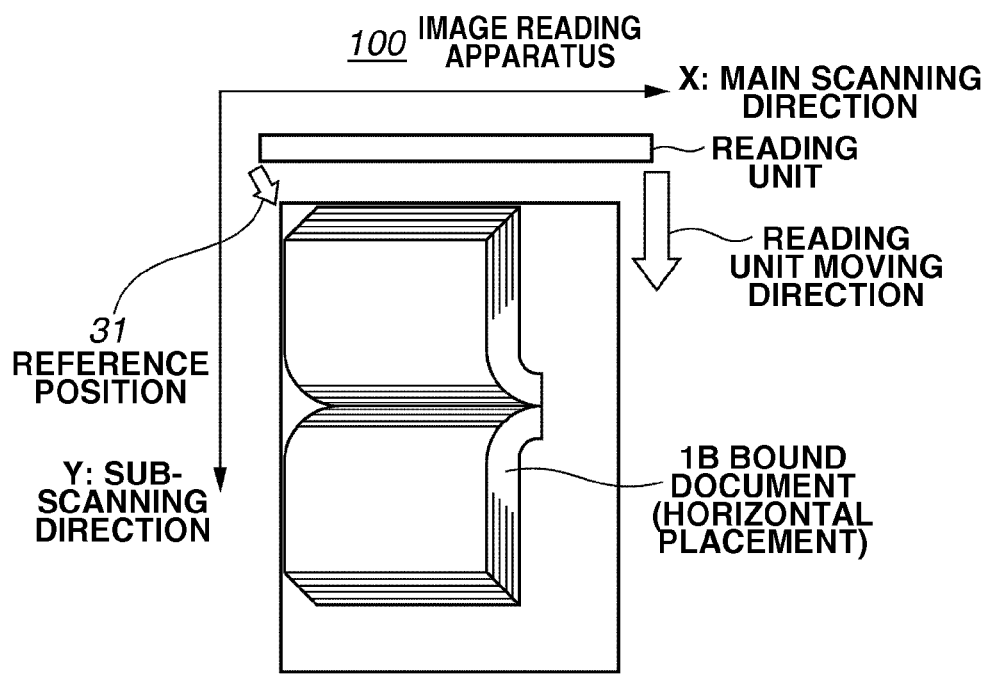

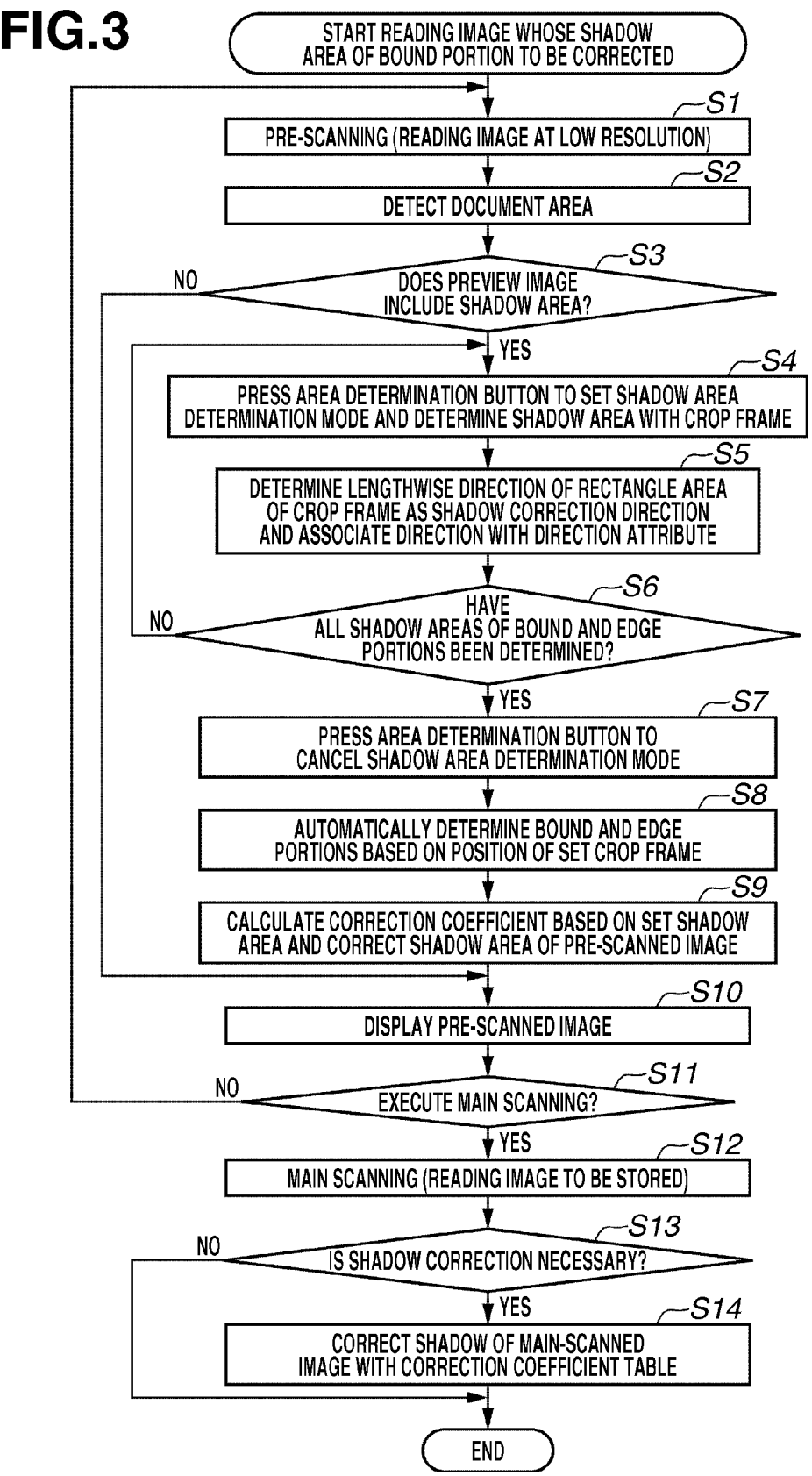

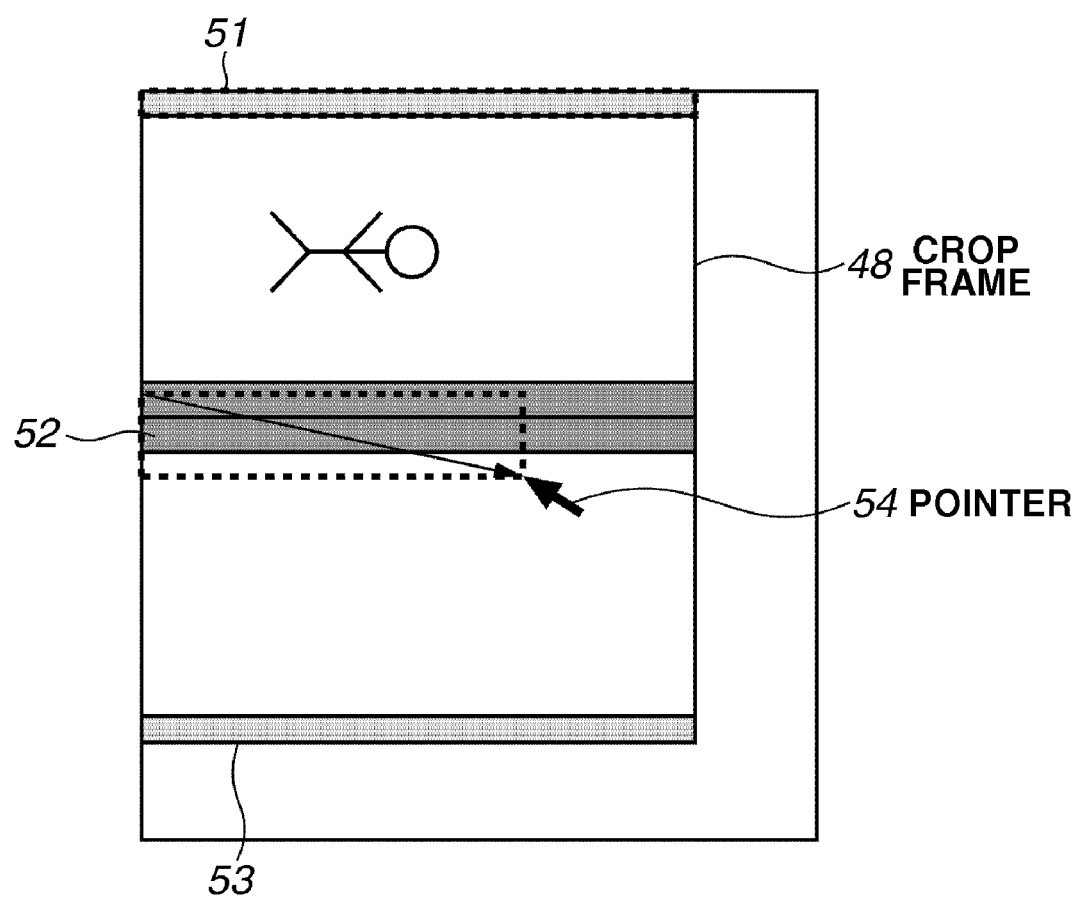

IMAGE READING METHOD, IMAGE READING APPARATUS, AND PROGRAM RECORDING MEDIUM

BACKGROUND OF THE INVENTION

1. Field of the Invention

The present invention relates to an image processing technique for correcting image data read by an image reading apparatus such as an image scanner, a copying machine, or a multifunction peripheral.

2. Description of the Related Art

When a user uses an image reading apparatus such as an image scanner or a copying machine to read or make a copy of a bound document such as a book or a magazine, the user needs to place two facing pages of the bound document face-down on a document positioning glass plate. The document is then illuminated through the document positioning plate, and reflected light from the document is read through the document positioning plate. In this way of reading a document, a bound portion near a boundary between the two facing pages of the document placed face-down and end portions (hereinafter referred to as "edge portions") where paper sheets overlap one another on the both sides of the document are lifted from the document positioning plate.

As a result, the bound portion and edge portions of the read image data include shadows or distortion, and visibility of an output image is deteriorated. Particularly, if an image includes text in dark areas near the bound portion, the text is hard to recognize and read. This is particularly problematic in the case of thick books. Further, if such image data is printed, toner or ink is unnecessarily consumed, and printing costs per page are increased.

However, to obtain good image quality, if the bound portion of a book document is tightly pressed onto a document positioning plate to prevent the lift of the document from the document positioning plate, the book document may be damaged.

To solve this problem, a method referred to as "shape from shading" is known. The method is used to correct dark areas of a copy of a bound document by estimating three-dimensional (3D) shape of an object, namely, a shape of a lifted document, based on image density distribution information. However, since this method requires an enormous amount of calculation and longtime for correction processing, it is difficult to put the method to practical use.

To effectively correct such dark areas with a less amount of calculation, U.S. Pat. No. 6,330,050 discusses an image correction apparatus which estimates a 3D shape of a book document based on a shape of a page contour line of a read image.

Further, US Patent Application No. 2008/0024845, the assignee of which is the same as that of the present invention, discusses an image reading method for automatically detecting and correcting shadow areas.

However, most image reading apparatuses such as small-sized image scanners, multifunction peripherals, and copying machines are limited in a surface size (A4 size or letter size) of the document positioning plate or a direction in which a cover of the document positioning plate opens. Thus, a user cannot always place a document in a given direction. Namely, based on the above conventional method, all of two facing pages of a document and the contour lines of the pages cannot be read, and thus, suitable correction results may not be obtained.

SUMMARY OF THE INVENTION

The present invention is directed to an image processing method for obtaining a suitable correction result even when a user cannot place a bound document having bound portion and edge portions in a given direction because of a shape of the document, a surface size of a document positioning plate, or a direction in which a document positioning plate cover opens.

According to an aspect of the present invention, a method for image processing in which an image of a bound document such as a book placed face-down on a document positioning plate is read and processed is provided. The method includes reading the bound document through the document positioning plate, displaying the read image, the read image having at least one of a shadow portion of a bound portion and a shadow portion of an edge portion, inputting information about a direction attribute of a rectangular area of the shadow portion in the displayed image, determining the direction attribute based on the input information, and correcting a density of the rectangular area based on the determined direction attribute.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2A illustrates a bound document which is placed its bound portion and edge portions parallel to a sub-scanning direction.

FIG. 2B illustrates a bound document which is placed its bound portion and edge portions parallel to a main scanning direction.

FIG. 3 is a flow chart illustrating an operation of correcting a shadow density of bound portion and edge portions according to a first exemplary embodiment.

FIG. 4B illustrates an area determination method.

DESCRIPTION OF THE EMBODIMENTS

Various exemplary embodiments, features, and aspects of the invention will be described in detail below with reference to the drawings.

Figure 1:
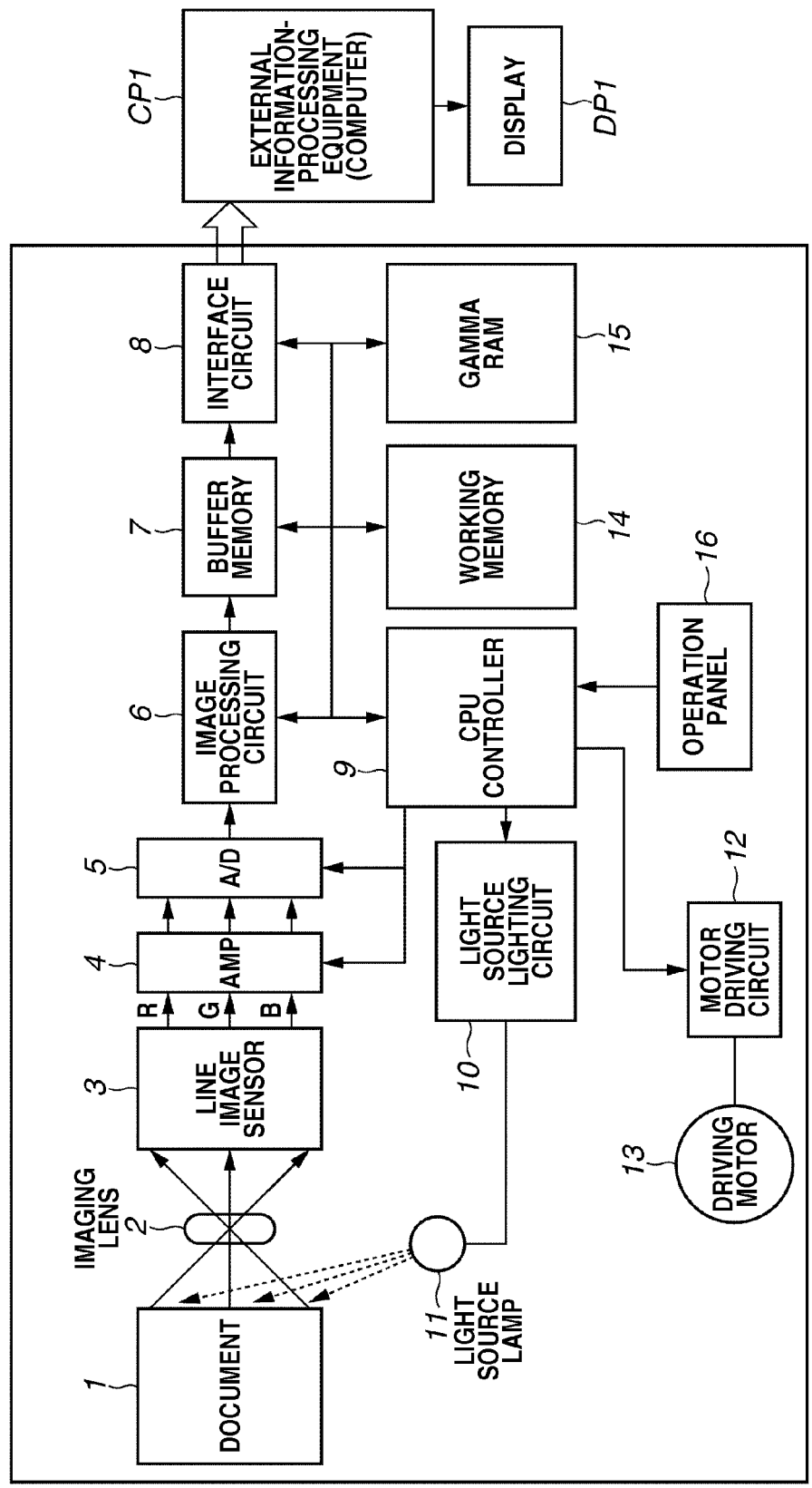
FIG. 1 is a block diagram illustrating a configuration of an image reading apparatus and external information-processing equipment.

FIG. 1 is a block diagram illustrating a configuration of an image reading apparatus 100 and external information-processing equipment CP1. The image reading apparatus 100 includes an imaging lens 2, a line image sensor 3, an amplifier 4, an analog-to-digital (A/D) converter 5, an image processing circuit 6, a buffer memory 7, an interface circuit 8, and a central processing unit (CPU) controller 9.

The image reading apparatus 100 further includes a light source lighting circuit 10, a light source lamp 11, a motor driving circuit 12, an optical system driving motor 13, a working memory 14, a gamma random access memory (RAM) 15, and an operation panel 16.

The interface circuit 8 sends and receives commands or images to and from the external information-processing equipment CP1. The interface circuit 8 uses an interface such as a small computer system interface (SCSI), a parallel port, a universal serial bus (USB), or the institute of electronic and electrical engineering (IEEE) 1394. The external information-processing equipment CP1 is a host computer such as a personal computer and is connected to a display DP1.

A document 1 is placed on a transparent document positioning glass plate. The light source lighting circuit 10 drives and lights the light source lamp 11. The light source lamp 11 diagonally illuminates the document 1 placed on the document positioning glass plate through the document positioning glass plate. Reflected light having an intensity that depends on a density of a surface of the document 1 enters the imaging lens 2 through the document positioning glass plate. The imaging lens 2 then forms an image on the line image sensor 3, which is a solid-state image sensor such as a charge coupled device (CCD) image sensor.

This optical system is arranged to be able to efficiently form an image based on a quantity of the reflected light from the document placed on the document positioning glass plate. However, if there is a space between the document and the document positioning glass plate, the document cannot be illuminated efficiently, and an angle of the reflected light is changed. Therefore, an image formed on the line image sensor 3 is darkened. As a result, a read image includes shadows.

FIG. 2A illustrates a bound document 1A placed on the document positioning plate, with the bound portion and edge portions in parallel with a sub-scanning direction in which a reading optical unit moves. Such placement of the bound document 1A as shown in FIG. 2A is referred to as "vertical placement" herein.

When two facing pages of a book document are placed on the document positioning plate, a bound portion between the pages is lifted from the document positioning plate. A bound portion shadow area 33 is a shadow caused at the bound portion. Edge portions 32 and 34 are end portions where paper sheets overlap one another on the both sides of the document. Since the edge portions 32 and 34 are also lifted from the document positioning plate, shadows are caused at the edge portions 32 and 34.

FIG. 2B illustrates a bound document 1B placed on the document positioning plate, with the bound portion and edge portions in parallel with a main scanning direction in which an image reading sensor is disposed. Such placement of the bound document 1B as shown in FIG. 2B is referred to as "horizontal placement" herein.

FIGS. 2A and 2B characteristically illustrate directions of images formed on the reading sensor and schematically illustrate images seen from below the bottom surface of the document positioning plate (from inside the casing). A reference position 31 is a starting position for reading a document placed on the document positioning plate. In the case of the vertical placement, a shadow density of the bound portion is uniform in the sub-scanning direction and gradually changes in the main scanning direction. In the case of the horizontal placement, the shadow density of the bound portion is uniform in the main scanning direction and gradually changes in the sub-scanning direction. In response, the shadow is corrected to be uniformly brightened in the direction in which the shadow density is uniform and to be gradually brightened in the direction in which the shadow density gradually changes.

Next, an operation of correcting a shadow density of the bound portion shadow area 33 and the edge portions 32 and 34 of the bound document 1B according to the first exemplary embodiment will be described. FIG. 3 is a flow chart illustrating an operation of correcting the shadow density of the bound portion shadow area 33 and the edge portions 32 and 34 of the bound document 1B. The operation is executed based on a program stored in a storage device (not shown) of the external information-processing equipment CP1.

First, in step S1, the external information-processing equipment CP1 issues an instruction to the image reading apparatus 100 to read an image on an entire surface of the document positioning plate at a relatively low resolution and receives the read image. This image is a preliminarily scanned image used to detect a document area on the document positioning plate and to analyze a shadow area of the bound portion. The image will be referred to as a "pre-scanned image."

In step S2, the pre-scanned image is analyzed and the document area on the document positioning plate is determined. Since a document area determination method is known, the description thereof will be omitted herein.

After step S3, it is determined whether the bound portion shadow area 33 and the edge portions 32 and 34 include a shadow within the document area detected in step S2, and shadow correction coefficients are calculated.

If a user determines that the bound portion shadow area 33 or the edge portions 32 and 34 include a shadow of which density needs to be corrected in the pre-scanned image (Yes in step S3), in step S4, the user encloses these shadow areas in a crop frame and selects the areas in the pre-scanned image. The user sets the image reading apparatus 100 to a shadow area determination mode. In this mode, the user can select the areas of the bound portion shadow area 33 and the edge portions 32 and 34 with the crop frame.

Figure 4A:
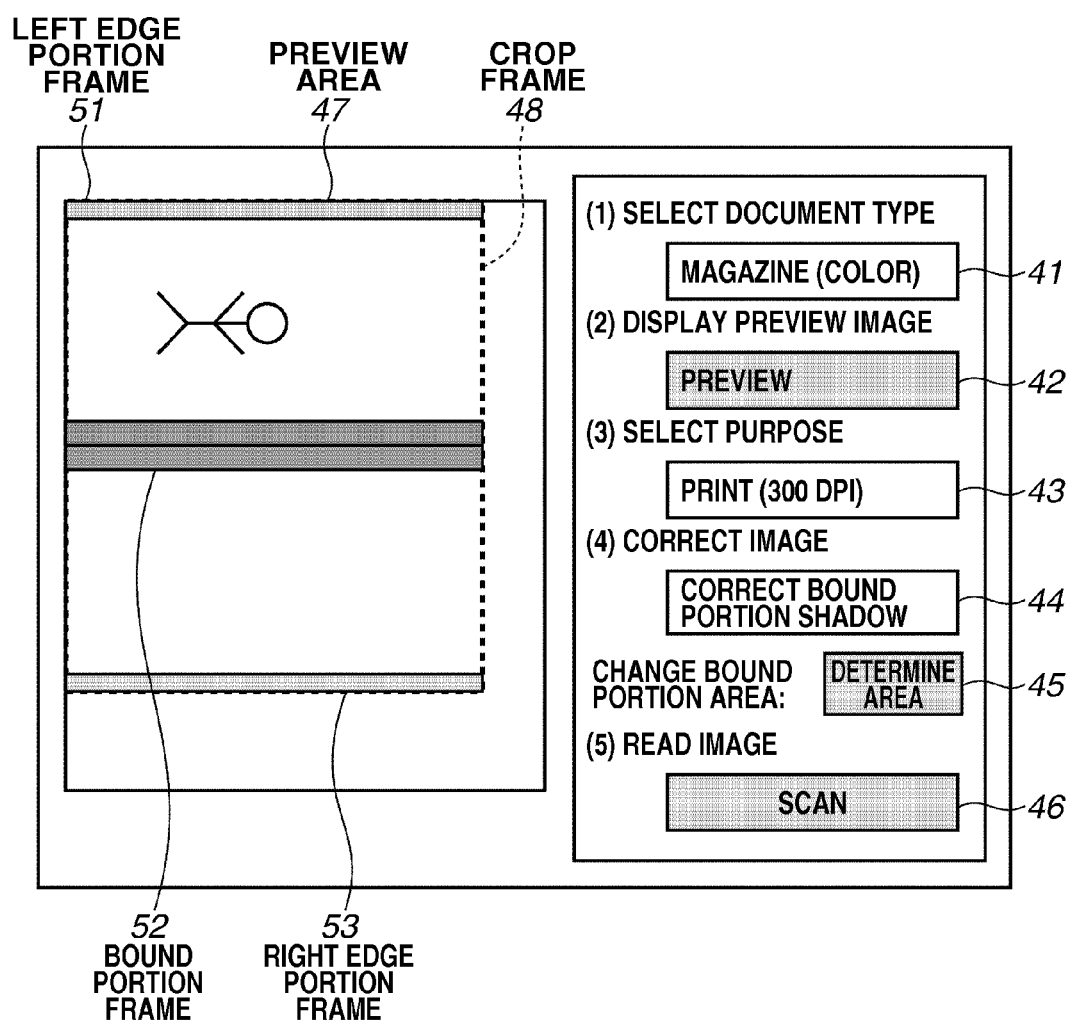
FIG. 4A illustrates a user interface of the image reading apparatus which operates based on external information-processing equipment.

FIG. 4A illustrates a user interface (UI) of the driver of the image reading apparatus 100 displayed on the display DP1 which is connected to the external information-processing equipment CP1.

By pressing an area determination button 45 which is displayed on the user interface and is used to change the bound portion area, the user sets the image reading apparatus 100 to the shadow area determination mode in which the user can select the crop frame enclosing shadow areas of the bound portion shadow area 33 and the edge portions 32 and 34 displayed in the pre-scanned image. When rectangular areas of shadows of the bound portion shadow area 33 and the edge portions 32 and 34 are set on the pre-scanning screen, in step 5, a lengthwise direction of the rectangle areas is determined as a lengthwise direction of areas on which shadow correction is performed. In this way, the rectangular areas are associated with a direction attribute.

Since shadows of such rectangular areas are always corrected in a direction perpendicular to a bound portion direction, association of a direction attribute is necessary. Normally, three areas of a right edge portion, a center bound portion, and a left edge portion are determined as the bound portion shadow area 33 and the edge portions 32 and 34. Thus, in step S6, whether the bound portion shadow area 33 and the edge portions 32 and 34 in the read image have been set is determined. If not (No in step S6), operations in the steps S4 and S5 are repeated. When the document is larger than the document positioning plate, all three areas may not be read.

After the areas are determined on the pre-scanning screen (Yes in step S6), in step S7, the user presses the area determination button 45 on the user interface shown in FIG. 4A to cancel the shadow area determination mode.

After the shadow area determination mode is cancelled, in step S8, based on positions of the rectangular areas of the bound portion shadow area 33 and the edge portions 32 and 34, the bound portion and edge portions are automatically determined.

Next, in step S9, based on the determined bound portion shadow area 33 and edge portions 32 and 34 as well as the direction attribute of the shadow areas, density correction coefficients of the shadow areas are calculated. By using a shadow density correction coefficient table in which density correction coefficients of the calculated shadow areas are described, a shadow density of each of the shadow areas in the pre-scanned image is corrected.

After the shadow correction processing is executed on the pre-scanned image in step 9, in step S10, the pre-scanned image including corrected shadow areas of the bound portion shadow area 33 and the edge portions 32 and 34 is displayed on the display DP1 which is connected to the external information-processing equipment CP1.

If it is determined that the image displayed on the display screen has been suitably corrected, then in step S11, the external information-processing equipment CP1 issues an instruction to the image reading apparatus 100 to read the document area at a desired resolution.

In step 12, the image reading apparatus 100 reads the document image based on designated reading conditions (resolution and the like) and sends the image to the external information-processing equipment CP1. The sent image will be stored and is referred to as a "main-scanned image" in the first exemplary embodiment.

In step S13, the external information-processing equipment CP1 determines whether the shadow of the bound portion need to be corrected based on analysis results of the pre-scanned image. If it is determined that shadow density correction is needed (Yes in step S13), in step S14, resolution conversion is performed on the shadow correction coefficient table obtained by analyzing the pre-scanned image. The converted table is applied to the shadow areas of the bound portion and edge portions in the main-scanned image, and the shadow density of each of the shadow areas is corrected. Thus, a desired image is obtained.

Next, the crop frame enclosing the shadow areas of the bound portion shadow area 33 and the edge portions 32 and 34 displayed in the pre-scanned image as shown in FIG. 4A will be described in detail.

First, a user presses a button 41 to select a document type. Next, the user presses a "Preview" button 42 to display a pre-scanned image of the document in a preview area 47. In this preview area 47, the document area is detected (operation in step S2), and an area enclosed by a dotted line is displayed as a crop frame 48 in FIG. 4A.

Further, by selecting "Correct bound portion shadow" under the "Correct image" section with a "Correct bound portion shadow" button 44, the user can set the crop frame on the user interface to set and change the shadow areas of the bound portion shadow area 33 and the edge portions 32 and 34 in the pre-scanned image.

By pressing the area determination button 45, the user switches to the shadow area determination mode to execute shadow correction processing within the crop frame. In the shadow area determination mode, the user can adjust a size and a position of each of a left edge portion frame 51, a bound portion frame 52, and a right edge portion frame 53 in the pre-scanned image displayed in the preview area 47. Then, the user can check whether desired shadow areas have been obtained as a result of the adjustment.

After the user checks the adjusted shadow areas in the pre-scanned image, the user presses the area determination button 45 again to cancel the shadow area determination mode. The user then acquires a main-scanned image by pressing a scan button 46.

FIG. 4B illustrates an area determination method in the shadow area determination mode. The user can operate a pointer 54 in the pre-scanned image displayed in the preview area 47. As shown in FIG. 4B, the user can select areas with this pointer 54.

As shown in FIG. 4B, the left edge portion frame 51 is determined and enclosed by a dotted line. Similarly, each of the bound portion frame 52 and the right edge portion frame 53 is determined and enclosed by a dotted line.

In the first exemplary embodiment, the lengthwise direction of a rectangular area of a shadow area is determined as a shadow correction direction, and is associated with the rectangular area as a direction attribute. However, a widthwise direction of a rectangular area of a shadow area may be determined as a shadow correction direction and associated with the rectangular area as a direction attribute. The rectangular area exhibits a small change of shadow density in the lengthwise direction and a large change of shadow density in the widthwise direction. When the lengthwise direction is designated as the direction attribute, the density change perpendicular to the lengthwise direction is primarily corrected. When the widthwise direction is designated as the direction attribute, the density change in the widthwise direction is primarily corrected.

Figure 5:
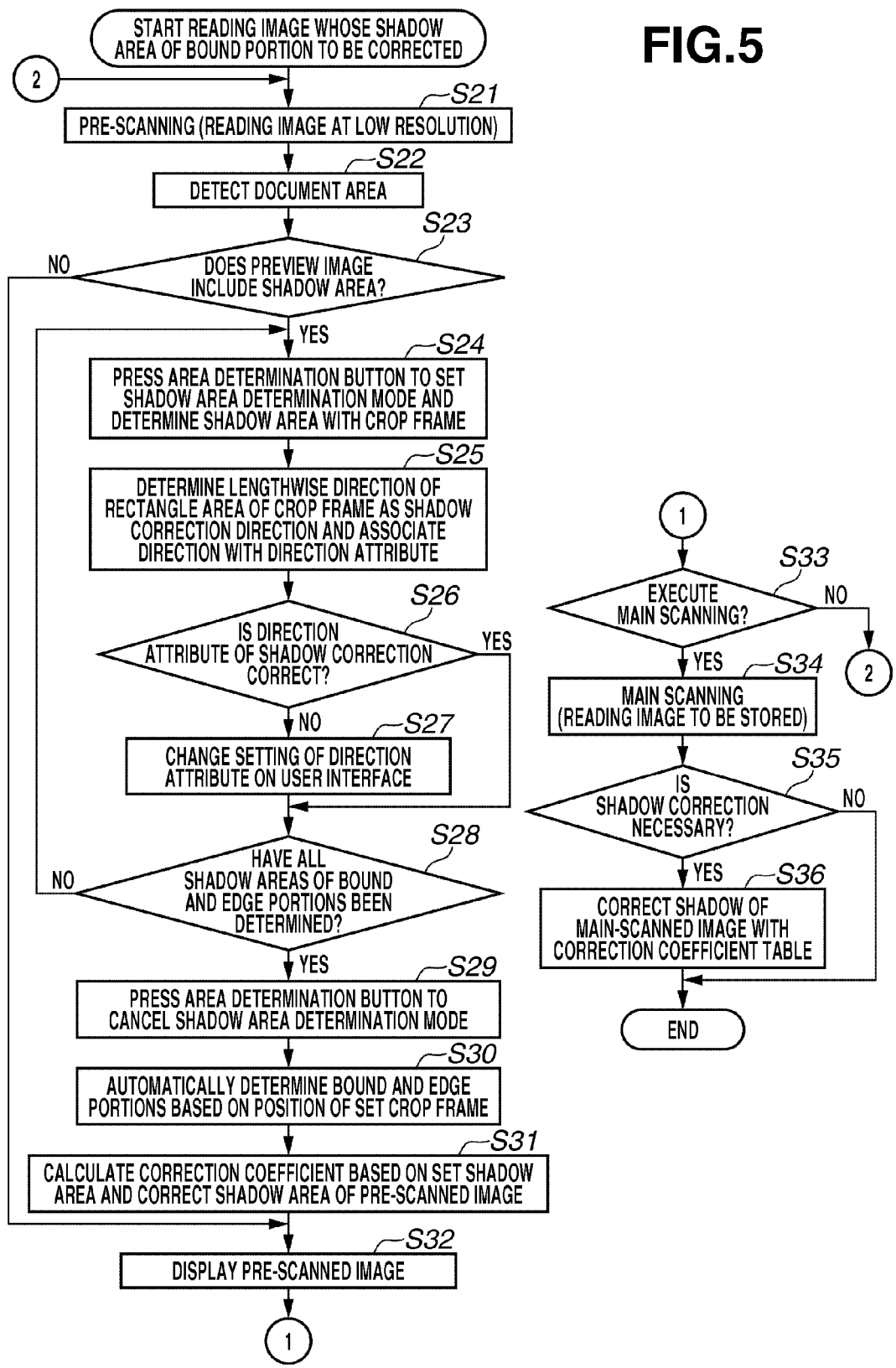
FIG. 5 is a flow chart illustrating an operation according to a second exemplary embodiment of the present invention.

Next, a second exemplary embodiment of the present invention will be described. FIG. 5 is a flow chart illustrating an operation according to the second exemplary embodiment of the present invention.

The configuration of the image reading apparatus of the second exemplary embodiment is basically similar to that of the image reading apparatus 100 of the first exemplary embodiment. Further, the configuration of the external information-processing equipment is basically similar to that of the external information-processing equipment CP1 of the first exemplary embodiment.

Operations in steps S21 to S25 of FIG. 5 are similar to those in steps S1 to S5 of FIG. 3 in the first exemplary embodiment. Further, operations in steps S29 to S36 are similar to those in steps S7 to S14 of FIG. 3 in the first exemplary embodiment.

Processing in the second exemplary embodiment differs from that in the first exemplary embodiment in steps S26 and S27. While the lengthwise direction of a selected rectangular area is automatically determined and associated with a direction attribute for shadow correction, the direction attribute may be incorrectly associated in some cases. In this case, the user can correct the direction attribute on the user interface in steps S26 and S27.

Figure 6A:
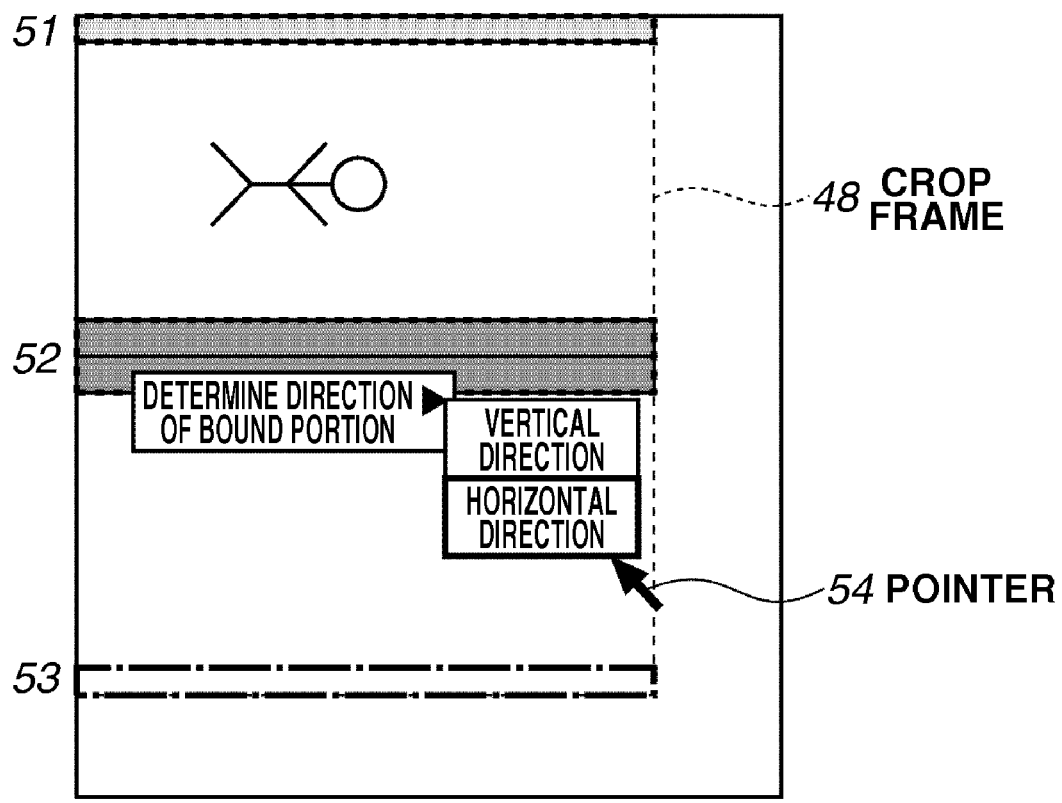
FIG. 6A illustrates how to change a direction attribute on the user interface according to the second exemplary embodiment.

FIG. 6A illustrates how to change a direction attribute on the user interface according to the second exemplary embodiment. The crop frame 48 includes the bound portion frame 52 determined as the bound portion. The user can check the direction attribute for shadow correction of the bound portion frame 52 by using the pointer 54 to display a frame for indicating a specified direction. The direction attribute is a horizontal direction in the example shown in FIG. 6A. If the specified direction is incorrect, the user can correct the direction with the pointer 54.

Figure 6B:
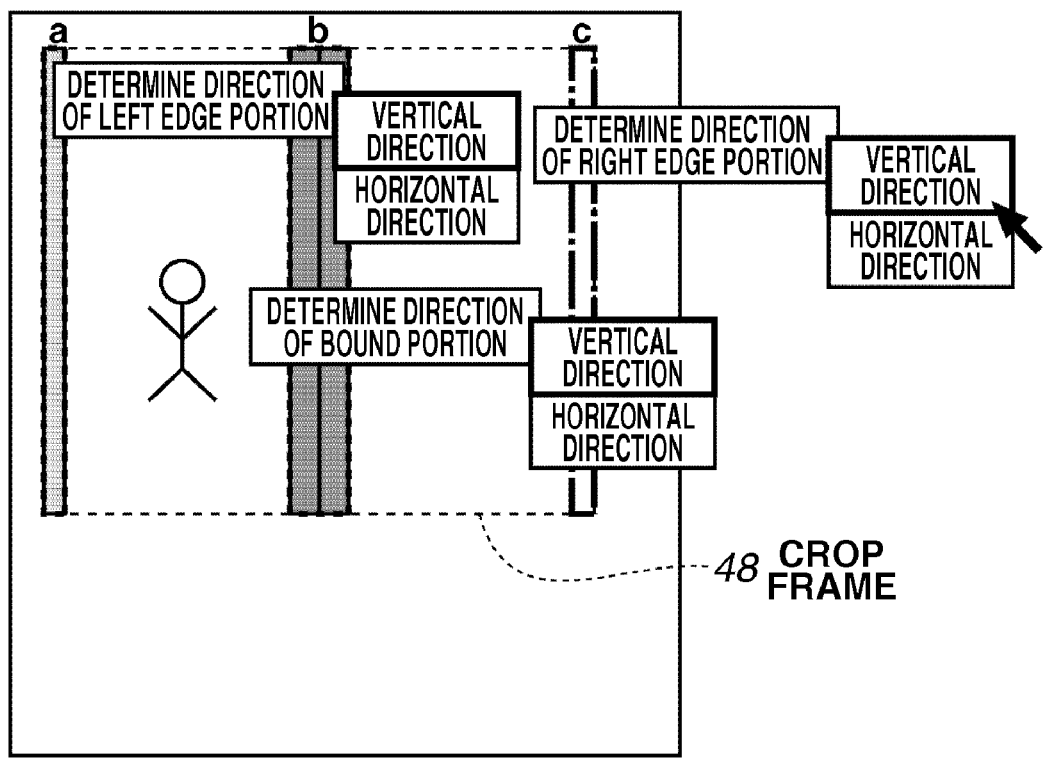
FIG. 6B illustrates how to change direction attributes of a right edge portion, the bound portion, and a left edge portion separately.

FIG. 6B illustrates how to check specified direction attributes of a right edge portion, a bound portion, and a left edge portion separately according to the second exemplary embodiment. The three portions of a single document must be arranged in the same direction. If not, a warning may be displayed and the directions may be changed separately.

In the first exemplary embodiment, the bound portion and edge portions are set based on a pre-scanned image acquired by a preliminary scan at a low resolution. However, in a third exemplary embodiment, the bound portion and edge portions are set based on a main-scanned image. According to the third exemplary embodiment, a bound document which has the bound portion shadow area 33 and the edge portions 32 and 34 is scanned, and appropriate areas in the obtained image are selected. In this way, shadows and distortion of the bound portion and edge portions can be accurately corrected, and a desired image can be obtained.

Figure 7:
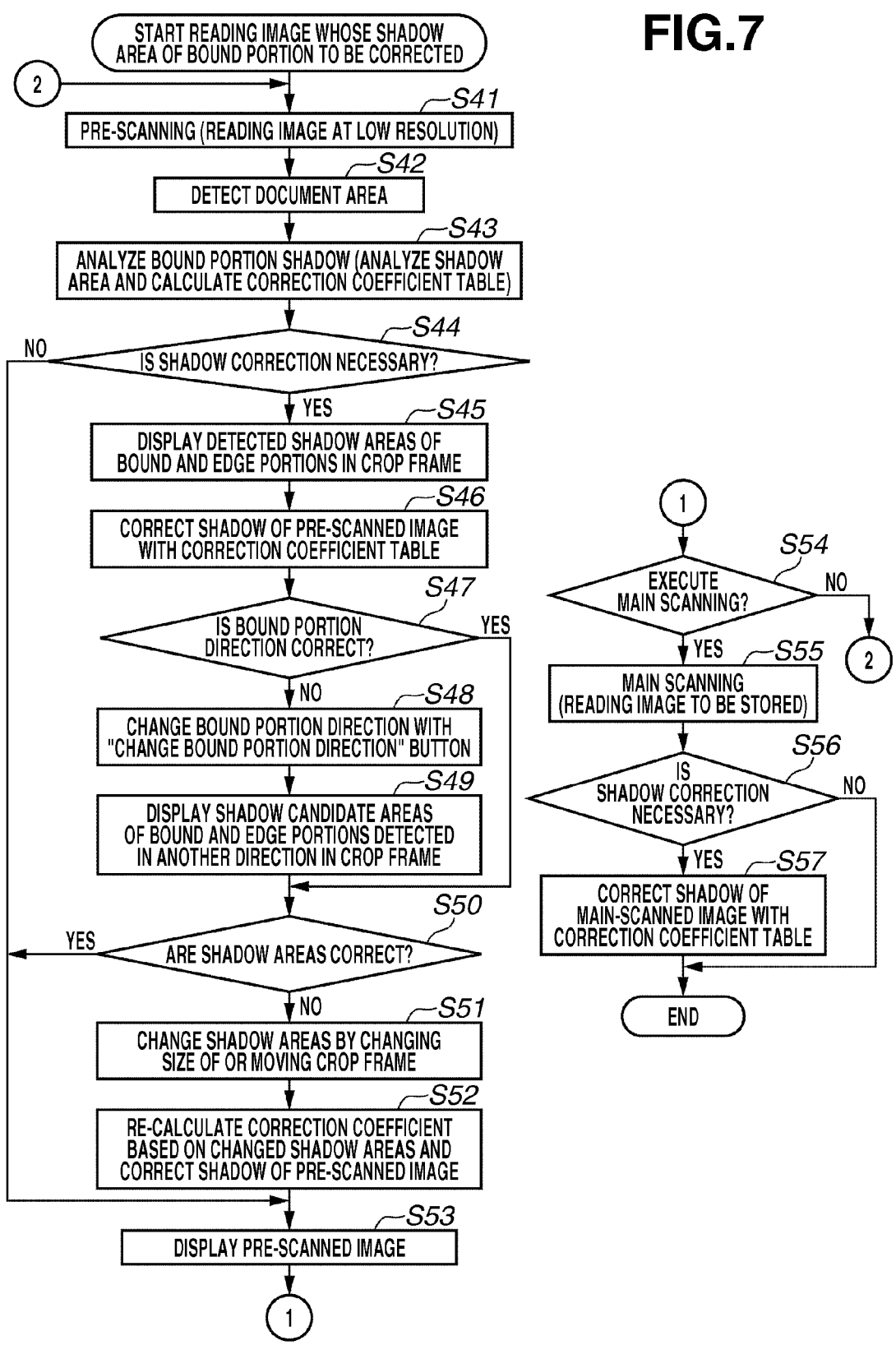
FIG. 7 is a flow chart illustrating an operation of acquiring an image in which a shadow density of the bound portion and edge portions of the bound document has been corrected according to a fourth exemplary embodiment.

FIG. 7 is a flow chart illustrating an operation of acquiring an image in which a shadow density of the bound portion and edge portions of the bound document is corrected according to a fourth exemplary embodiment. In accordance with the following steps, a program stored in a storage device (not shown) of external information-processing equipment CP2 acquires an image in which the shadow of the bound portion is corrected.

Operations in steps S41 and S42 of FIG. 7 are similar to those in steps S1 and S2 of FIG. 3 in the first exemplary embodiment.

In step S43, shadows of the bound portion and edge portions are detected within the document area detected in step S42, and shadow correction coefficients are calculated.

In this fourth exemplary embodiment, the bound portion shadow area 33 and the edge portions 32 and 34 are automatically detected. Among these areas automatically detected, the areas that are most likely to be shadow areas are determined.

In step S44, based on results of step S43, whether a shadow of the bound portion or the edge portions has been detected is determined. If the bound portion or the edge portions include any shadow areas in which the shadow density needs to be corrected (Yes in step S44), in step S45, these areas are enclosed in the crop frame and displayed in the pre-scanned image.

Next, in step S46, the shadow density of the shadow area in the pre-scanned image is corrected by using the shadow correction coefficient calculated in step S43.

Figure 8A:
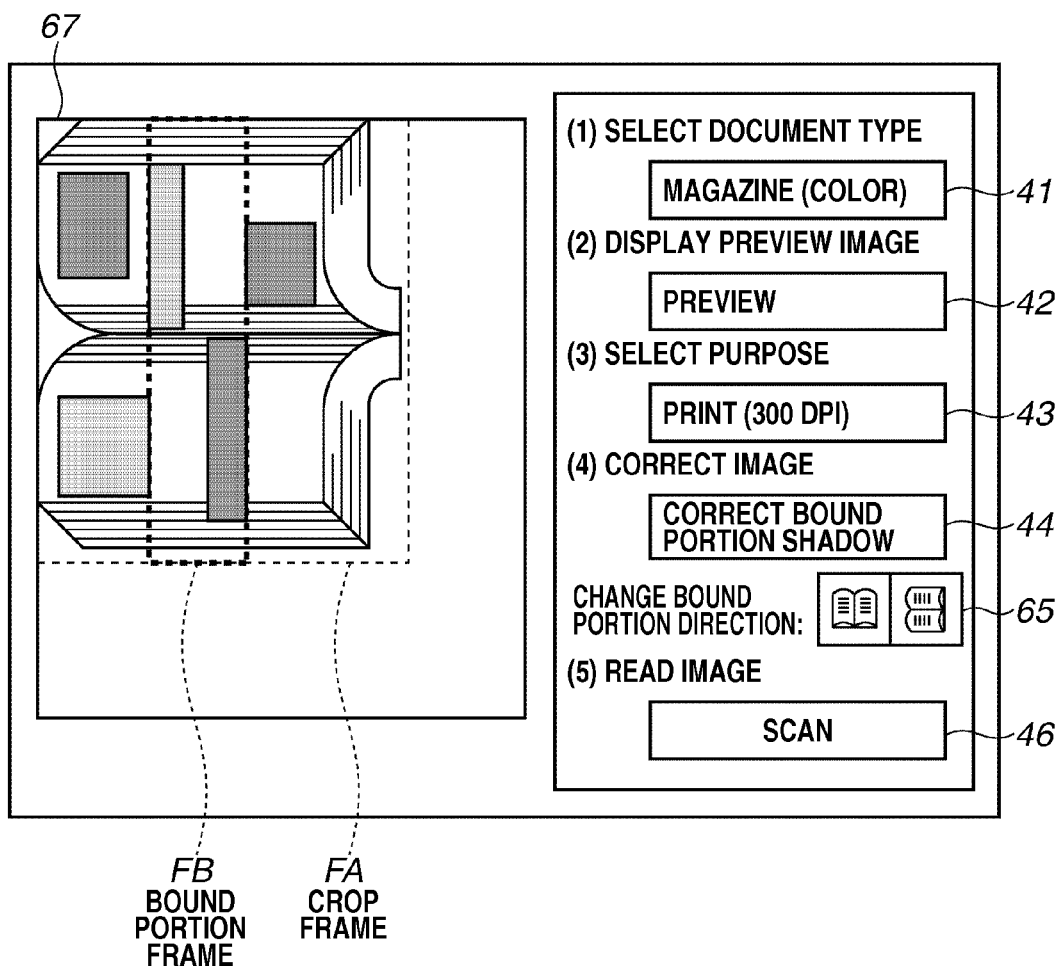
FIG. 8A illustrates a user interface of a driver of the image reading apparatus displayed on a display which is connected to the external information-processing equipment.

If the direction of the detected bound portion is incorrect (No in step S47), in step S48, the user can change the direction of the bound portion by using a "Change bound portion direction" button 65 shown in FIG. 8A.

In step S49, the shadow area candidates of the bound portion and edge portions in a direction different from that of the areas determined to be the most-likely shadow areas among the shadow area candidates in horizontal and vertical directions automatically detected in step S43 are displayed in the crop frame.

Next, if a detected shadow area differs from an actual shadow area (No in step S50), in step S51, the shadow density correction area can be adjusted by changing the size of or moving the crop frame enclosing the bound portion shadow area 33 and the shadow areas of the edge portions 32 and 34 displayed.

In step S52, based on an adjusted shadow area, a correction coefficient is calculated again, and shadow correction processing is executed on the pre-scanned image. In step S53, the pre-scanned image in which the shadow of the bound portion has been corrected is displayed on a display DP2 which is connected to the external information-processing equipment CP2.

Operations in steps S53 to S57 of FIG. 7 are similar to those in steps S10 to S14 of FIG. 3 in the first exemplary embodiment.

FIG. 8A illustrates a user interface of a driver of an image reading apparatus 200 displayed on the display DP2 which is connected to the external information-processing equipment CP2. Next, a crop frame enclosing the bound portion shadow area 33 and the shadow areas of the edge portions 32 and 34 displayed in the pre-scanned image will be described in detail.

First, a user presses the button 41 to select a document type and presses the "Preview" button 42. Then, a pre-scanned image of the document is displayed in a preview area 67. The area of the document detected in step S42 is displayed as a crop frame FA.

Further, by selecting "Correct bound portion shadow" under the "Correct image" section with the "Correct bound portion shadow" button 44, crop frames enclosing the bound portion shadow area 33 and the shadow areas of the edge portions 32 and 34 detected in the pre-scanned image are displayed. An image in which shadow correction processing has been executed is displayed in the crop frame.

FIG. 8A illustrates an example in which a bound portion frame FB is displayed. In the figure, while the bound portion is determined to be in the vertical direction based on the background or design of the document, the bound portion is actually positioned in the horizontal direction. In such case, by pressing the "Change bound portion direction" button 65, the user can change the bound portion direction. In this example, the bound portion direction is changed to one of the directions of book icons displayed on the button 65.

Figure 8B:
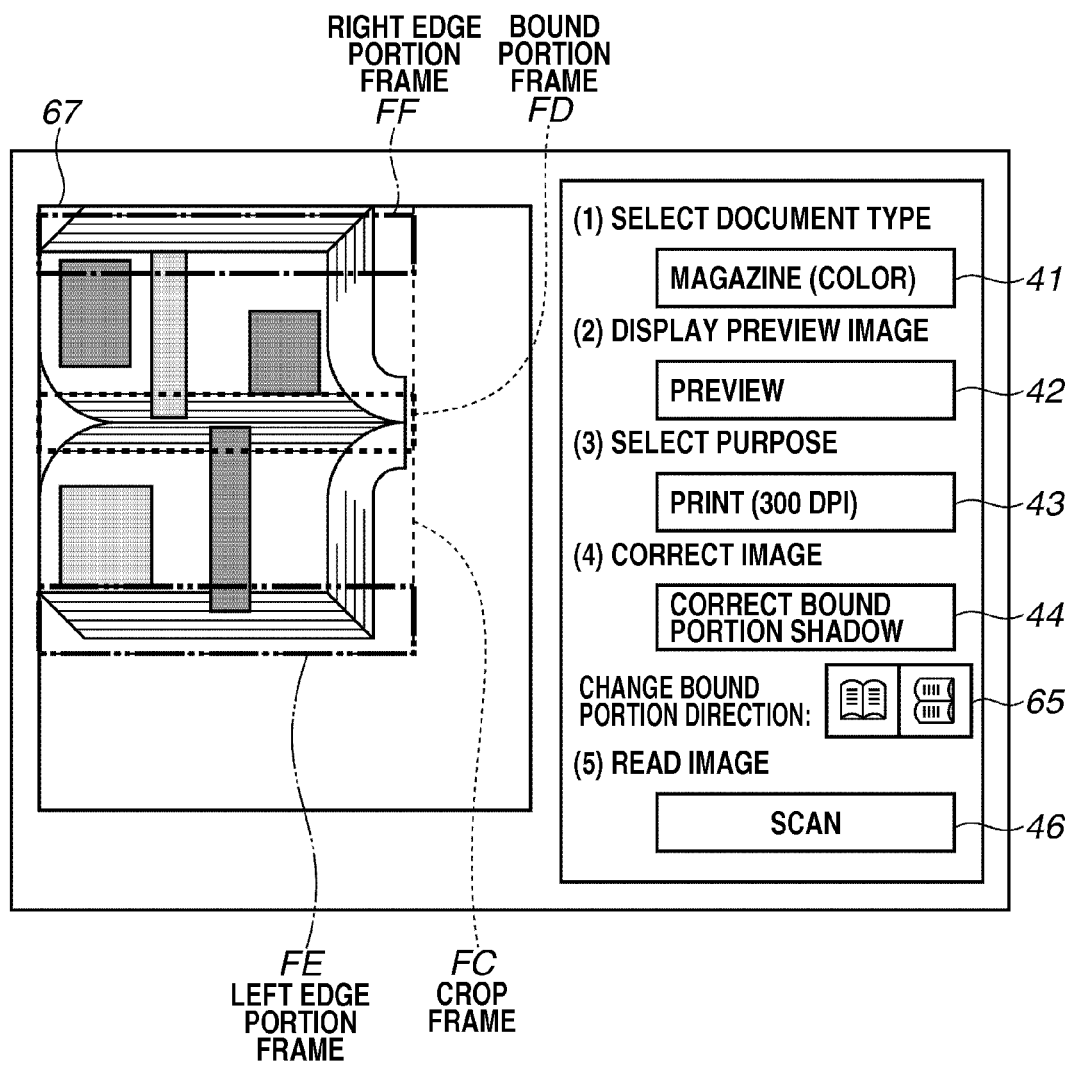
FIG. 8B illustrates change of a bound portion direction according to a direction of a book icon displayed on a button.

FIG. 8B illustrates change of the bound portion direction according to the direction of the book icon displayed on the button. Instead of the bound portion frame FB in the vertical direction, shadow candidates in the horizontal direction are displayed as a bound portion frame FD, a left edge portion frame FE, and a right edge portion frame FF. In each of the frames, an image which has a corrected shadow area is displayed.

These frames are displayed in a crop frame FC, and the user can change the size of or move each of the frames within the crop frame FC. Further, each of the frames is displayed by different lines. For example, each frame is formed by a line with a different color or type. In this way, the user can distinguish the crop frame FC, the bound portion frame FD, the left edge portion frame FE, and the right edge portion frame FF.

Figure 9:
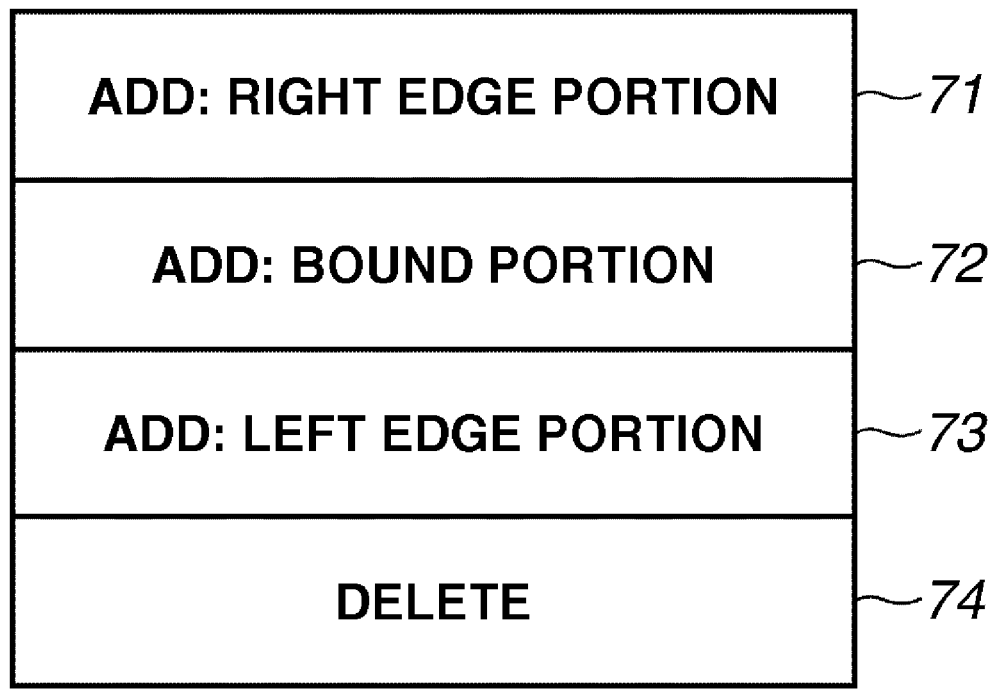
FIG. 9 illustrates a context menu, which is displayed by pressing a right mouse button, displayed by selecting a bound portion frame, a left edge portion frame, and a right edge portion frame.

FIG. 9 illustrates a context menu, which is displayed by pressing a right mouse button, displayed by selecting the bound portion frame FD, the left edge portion frame FE, and the right edge portion frame FF. The user can delete a selected frame by selecting a delete menu 74.

Also, by displaying the context menu in the crop frame FC, the user can add a right edge portion 71, a bound portion 72, and a left edge portion 73. The user can display only one frame for each of the left edge portion frame FE, the bound portion frame FD, and the right edge portion frame FF in the crop frame FC. If the crop frame FC does not include all of the above frames FE, FD, and FF, the user can add the frame(s) that is (are) not included. The user can also delete the above frame FE, FD, and/or FF. Frames which cannot be added or deleted in the context menu are grayed out.

The user can adjust the size and the position of each of the crop frame FC, the left edge portion frame FE, the bound portion frame FD, and the right edge portion frame FF in the pre-scanned image displayed in the preview area 67, and check if desirable correction results of shadow areas have been obtained. After the user checks the correction results in the pre-scanned image, the user presses the scan button 46 to acquire a main-scanned image.

The details of the following operations (1) and (2) used in the above exemplary embodiments are carried out by the same method discussed in US Patent Application No. 2008/0024845. (1) Detection of shadow areas of the bound portion and edge portions, calculation of shadow correction coefficients in step S43, and detection of shadow areas of the bound portion and edge portions in a different direction in step S49 of FIG. 7 of the fourth exemplary embodiment.
(2) Shadow density correction of the bound portion and edge portions in a pre-scanned image and a main-scanned image in steps S9 and S14 of FIG. 3 of the first exemplary embodiment, in steps S31 and S36 of FIG. 5 of the second exemplary embodiment, and in steps S52 and S57 of FIG. 7 of the fourth exemplary embodiment.

While the image reading apparatus 100 and the external information-processing equipment CP1 are connected in the above exemplary embodiments, an integrated type reading apparatus or multifunction peripheral may also be applicable.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-276876, filed Oct. 28, 2008, which is hereby incorporated by reference herein in its entirety.

What is claimed is:

1. A method for image processing, the method comprising:
acquiring a read image which is obtained by a reading, by a reading apparatus, of an original which has a binding portion and is set on the reading apparatus;
specifying, from the acquired read image, by analyzing the acquired read image, a first candidate area corresponding to the binding portion of the original in response to the original being set on the reading apparatus according to a first direction, and a second candidate area corresponding to the binding portion of the original in response to the original being set on the reading apparatus according to a second direction;
selecting a candidate area to be displayed from the first candidate area and the second candidate area, based on analyzing the acquired read image;
causing a display apparatus to display the selected candidate area;
determining a candidate area to be corrected which is designated from the first candidate area and the second candidate area by a user based on displaying the selected candidate area; and
correcting an area, in a read image of the original, corresponding to the determined candidate area as the binding portion of the original.

2. The method according to claim 1, further comprising:
changing, in response to the candidate area, selected from the first candidate area and the second candidate area, being displayed and a changing of the candidate area to be displayed being designated by a user, a candidate area to be displayed, and
causing the display apparatus to display a new candidate area to be displayed, to which the candidate area to be displayed is changed by the changing.

3. The method according to claim 2, wherein a candidate area displayed by the display apparatus is determined as an area to be corrected according to an instruction by a user based on the displaying.

4. The method according to claim 1, wherein the read image indicating the candidate area selected from the first candidate area and the second candidate area is displayed.

5. The method according to claim 4, further comprising adjusting the displayed candidate area according to an instruction by a user,
wherein the area to be corrected is determined based on the adjusted candidate area.

6. The method according to claim 1, further comprising:
determining an edge area corresponding to an edge portion of the original in a read image of the original, according to the determined candidate area to be corrected as the binding portion of the original; and
correcting the determined edge area corresponding to the edge portion.

7. The method according to claim 6, wherein the candidate area and the edge area are rectangular areas which corresponds to a same direction of setting of the original.

8. The method according to claim 6, wherein an edge area corresponding to a left edge portion of the original and an edge area corresponding to a right edge portion of the original are determined.

9. The method according to claim 6, wherein each of the candidate area and the edge area are displayed by different display methods.

10. The method according to claim 1, wherein the acquired read image of the original and the corrected read image of the original are read by different readings of the original.

11. A method for image processing, the method comprising:
an acquiring unit configured to acquire a read image which is obtained by a reading, by a reading apparatus, of an original which has a binding portion and is set on the reading apparatus;
a specifying unit configured to specify, from the acquired read image, by analyzing the acquired read image, a first candidate area corresponding to the binding portion of the original in response to the original being set on the reading apparatus according to a first direction, and a second candidate area corresponding to the binding portion of the original in response to the original being set on the reading apparatus according to a second direction;

a selecting unit configured to select a candidate area to be displayed from the first candidate area and the second candidate area, based on analyzing the acquired read image;
a control unit configured to cause a display apparatus to display the selected candidate area;
a determination unit configured to determine a candidate area to be corrected which is designated from the first candidate area and the second candidate area by a user based on displaying the selected candidate area; and
a correction unit configured to correct an area, in a read image of the original, corresponding to the determined candidate area as the binding portion of the original.

12. A non-transitory computer-readable recording medium storing a program causing an image reading apparatus to perform the method according to claim 11.

* * * * *